(12) United States Patent
van't Veen

(10) Patent No.: US 8,500,187 B2
(45) Date of Patent: Aug. 6, 2013

(54) HYDRAULIC SYSTEM WITH A PRESSURE RIPPLE REDUCTION DEVICE

(75) Inventor: Daniël van't Veen, Borne (NL)

(73) Assignee: Actuant Corporation, Menomonee Falls, WI (US)

( * ) Notice: Subject to any disclaimer, the term of this patent is extended or adjusted under 35 U.S.C. 154(b) by 202 days.

(21) Appl. No.: 12/989,237

(22) PCT Filed: Apr. 22, 2009

(86) PCT No.: PCT/EP2009/003424
§ 371 (c)(1), (2), (4) Date: Oct. 22, 2010

(87) PCT Pub. No.: WO2009/130059
PCT Pub. Date: Oct. 29, 2009

(65) Prior Publication Data
US 2011/0036083 A1    Feb. 17, 2011

(30) Foreign Application Priority Data
Apr. 23, 2008    (EP) ..................... 08075313

(51) Int. Cl.
*B60J 7/12*    (2006.01)
*B60J 5/10*    (2006.01)

(52) U.S. Cl.
USPC ................. 296/107.01; 296/50; 296/117

(58) Field of Classification Search
USPC .......... 296/146.8, 146.4, 50, 51, 57.1, 56, 296/107.01, 107.09, 112, 115, 117
See application file for complete search history.

(56) References Cited

U.S. PATENT DOCUMENTS

| | | | |
|---|---|---|---|
| 4,067,195 A | | 1/1978 | Malecha |
| 5,205,326 A | | 4/1993 | Paley et al. |
| 5,666,873 A | * | 9/1997 | Lindmayer et al. ............. 91/511 |
| 5,724,878 A | * | 3/1998 | Stolle et al. ..................... 91/165 |
| 5,983,946 A | * | 11/1999 | Chen et al. ...................... 138/30 |
| 6,073,656 A | * | 6/2000 | Chen et al. ...................... 138/26 |
| 6,123,108 A | * | 9/2000 | Chen et al. ...................... 138/30 |
| 6,149,221 A | * | 11/2000 | Mentink ....................... 296/117 |
| 6,234,758 B1 | | 5/2001 | Pawelski |
| 6,269,841 B1 | * | 8/2001 | Chen et al. ...................... 138/30 |
| 6,279,613 B1 | * | 8/2001 | Chen et al. ...................... 138/30 |
| 6,508,503 B2 | * | 1/2003 | Mentink ....................... 296/117 |
| 6,764,632 B2 | * | 7/2004 | Bhattacharyya et al. ...... 264/250 |
| 7,325,570 B1 | * | 2/2008 | Krieger ............................ 138/26 |
| 2006/0243335 A1 | | 11/2006 | Krieger et al. |

OTHER PUBLICATIONS

European Patent Office, European Search Report for priority application EP 08075313, dated Sep. 24, 2008.
International Search Report under date of mailing of Jul. 2, 2009 in connection with PCT/EP2009/003424.

* cited by examiner

*Primary Examiner* — Glenn Dayoan
*Assistant Examiner* — Gregory Blankenship

(57) ABSTRACT

A hydraulic system for a vehicle, comprising a hydraulic actuation device for moving one or more moveable components of the vehicle. The actuation device comprises a hydraulic pump with an associated drive means, a reservoir for hydraulic fluid as well as one or more hydraulic actuators connected to the pump through hydraulic hoses. The hydraulic actuators act on the one or more moveable components. The pump is designed to supply pressurized hydraulic fluid to the one or more hydraulic actuators. A pressure ripple reduction device for reducing pressure ripples in the hydraulic fluid originating from the hydraulic pump is provided, having an expansion chamber.

35 Claims, 4 Drawing Sheets

HYDRAULIC SYSTEM WITH A PRESSURE RIPPLE REDUCTION DEVICE

CROSS-REFERENCE TO RELATED APPLICATIONS

This application claims the benefit of PCT International Application No. PCT/EP2009/003424 filed on Apr. 22, 2009, which claims the benefit of European Patent Application No. 08075313.0 filed on Apr. 23, 2008, both of which are incorporated herein by reference.

STATEMENT CONCERNING FEDERALLY SPONSORED RESEARCH OR DEVELOPMENT

Not applicable.

FIELD OF THE INVENTION

The present invention relates to a hydraulic system for a vehicle for reducing pressure ripples.

BACKGROUND OF THE INVENTION

Hydraulic systems designed to move moveable components are for example used in vehicles such as cars and trucks. Taking the example of cars used for personal transport, such hydraulic systems are for example used for convertibles in which the convertible top can move from a closed position, in which the convertible top covers the passenger compartment of the vehicle, and an open position in which the passenger compartment is open. Similarly, such as system could also be used for opening and closing so-called tailgates, in particular for more expensive Sports Utility Vehicles (SUV's) and the like.

Such hydraulic systems have proven to be very convenient for such purposes as hydraulic system are capable of generating relatively much power even at small dimensions of such systems, which in turn makes it possible to use hydraulic systems even when space is limited.

A drawback of hydraulic systems when used in the mentioned applications often is the generation of sound that is considered disturbing by users. In particular when plunger pumps are used as a source for the hydraulic pressure, the pressure ripples in the hydraulic fluid that originate from the rotating plungers are a source of sound which is often in audible ranges. Furthermore, it is not uncommon that at least some of the components of the hydraulic system are, in particular when used in cars, mounted parts that amplify the sound caused by the pressure ripples in the hydraulic fluid. On top of that when using such systems for opening and closing tailgates or convertible tops it has been encountered that the frequency of the sound generated may vary quickly with the varying load on the hydraulic system. Furthermore, it is seen in such systems that the frequencies occurring in the hydraulic system are not limited to pump piston frequencies, but that also higher harmonic pulsations are present that may oscillate those parts in cars that have higher Eigenfrequencies. This will increase the level of noise. Hence, a range of frequencies may occur that consequently generate a range of noise.

Attempts have been made and solutions have been proposed to alleviate the above identified problems associated with such hydraulic systems.

U.S. Pat. No. 6,234,758 discloses a hydraulic system comprising a variable volume side branch for attenuating fluid noise. The side branch comprises a variable volume fluid container having an inlet and an outlet, wherein the variable volume container is a side branch located between the inlet and the outlet. Inside the container a displaceable piston is provided. Displacement of the piston in the container will change the volume thereof. The system further comprises a controller for controlling the position of the piston in response to the speed of the pump. Displacement of the piston in the container is effected by means of a geared motor and a threaded rod to which the piston is coupled. The variable volume container has a substantially T-shaped design having a main flow through tubular portion between the inlet and outlet intersected by the open end of the container. The container functions as a resonator, in which, by movement of the piston, the damping is tuned to the specific frequency generated by the pump. In fact, the length of the side branch or container is normally equal to a quarter of the wavelength of the frequency to be dampened so that a reflected pressure wave with a phase shift of 180 degrees is generated by the side branch that will cancel the pressure wave or pressure ripple. The resonator is identified in U.S. Pat. No. 6,234,758 as being of the Helmholz type.

A significant drawback of the system disclosed in U.S. Pat. No. 6,234,758 is that only one frequency can be dampened per position of the piston in the container. This is inherent to the functioning of such a Helmholz resonator. Although the piston can be displaced in the container and consequently different frequencies can in principle be dampened, the system is not able to dampen a range of frequency values which occur in hydraulic systems. Furthermore, the known system cannot react quickly to changes in the frequency to be dampened and requires a dedicated controller for adjusting the position of the piston in the container, which makes the system complex, expensive and unsuitable for dampening of ranges of frequencies which may change in magnitude.

In United States patent application US 2006/0243335 A1 a wave tuner is disclosed which is designed to cancel pressure pulses within a hydraulic system. The wave tuner is designed to reflect pressure pulses with a one hundred and eighty (180) degree phase shift to cancel the succeeding pressure pulse. Hence, the wave tuner of US 2006/0243335 A1 is tuned to one frequency, or a small band of frequencies around that frequency, only.

A further fluid borne noise suppressor for dampening fluid borne noise in a hydraulic system in known from U.S. Pat. No. 4,067,195. The suppressor comprises a cylindrical shaped chamber which is provided with cooling fins on its outer surface and acts as a cooling device for transferring heat from the hydraulic fluid to the surroundings.

A further pressure damper is known from U.S. Pat. No. 5,205,326 which damper comprises a housing in which an expandable bellows is provided. The expandable bellows is filled with $N_2$ gas and can expand in the housing. The bellows can absorb pressure shock waves or pulsations and acts as a gas spring pulsation absorber.

SUMMARY OF THE INVENTION

The present invention aims at solving the above-mentioned problems associated with the known system of the prior art.

To this end the present invention provides a hydraulic system for a vehicle in which a pressure ripple reduction device is provided in a pressure line between the pump and one or more actuators, and comprises an expansion chamber having an inlet and an outlet. The inlet and outlet are distanced from each other so as to define a flow path through the expansion chamber for the hydraulic fluid. The expansion chamber has a cross-sectional area and the outlet has a cross-sectional area. A ratio between said cross-sectional areas is between 5 and 40000.

The inventor has realized that the provision of an expansion chamber between the hydraulic pump and a hydraulic actuator, and in particular in a pressure line through which pressurized hydraulic fluid is provided to the actuators, can effectively dampen a range of frequencies when the expansion chamber is part of the flow path of the hydraulic fluid. This means that the expansion chamber is in contrast with the prior art system part of the flow path. Consequently, during operation of the hydraulic system the full flow rate of hydraulic fluid will pass through the expansion chamber from the inlet to the outlet thereof. It does not form a side branch thereof which is by nature not part of the flow path.

Furthermore, the inventor has realized that a broad range of frequencies of pressure ripples or pressure waves in the hydraulic fluid can be attenuated by enabling the pressure waves or pressure ripples present in the hydraulic fluid to enter the expansion chamber and to be reflected of the inner wall, or walls depending in the specific design, of the chamber. More in particular a strong attenuation can be achieved when such pressure ripples are allowed to reflect of the wall of the expansion chamber as long and/or as often as possible, because the pressure ripples will than be allowed to effectively interact and loose energy, and their amplitude will be reduced. This is achieved by preventing, as much as possible, that the pressure ripples exit the expansion chamber via the outlet. This is controlled by the ratio between the cross-sectional areas of the outlet and the expansion chamber. In other words the larger this ratio, the smaller the chance that the pressure ripples will find the outlet and leave the expansion chamber. A ratio between 5 and 40000 has been found to provide good results while still being practical for normal hydraulic systems, wherein a ratio of 40000 is a practical upper limit in view of pressure drop over the pressure reduction device and a ratio of less than 5 may not yield satisfactory results. Furthermore, by varying the ratio the dampening characteristics of the pressure ripple reduction device can be tuned to the requirements, wherein the larger the ration the more the pressure ripples will be reduced.

By the provision of an expansion chamber according to the above characteristics, the pressure ripples are reduced by energy loss. This means that pressure ripples are not cancelled merely by a 180 degrees phase shift and consequently that the expansion chamber can handle multiple frequencies, i.e. the expansion chamber acts as a broadband dampening device. Hence, a very simple and cost effective solution for the reduction of a range of frequencies in pressure ripples in an hydraulic system is provided.

In an embodiment said ratio is between 50 and 20000, more in particular between 500 and 5000. Such ratios comply very well with the size of common hydraulic systems for vehicles and allow the provision of relatively small pressure ripple reduction devices while still providing good dampening results.

In an embodiment the inlet has a cross-sectional area that corresponds in size to the cross-sectional area of the outlet, which has proven to further enhance the dampening performance of the pressure ripple reduction device.

In an embodiment the pressure ripple reduction chamber is designed as a substantially elongate member comprising a first closed terminal end and a second closed terminal end, wherein the inlet is provided near the first terminal end and the outlet is provided near the second terminal end. In this manner a simple construction is provided and the inlet and outlet are distanced from each other so as to reduce the chance that the pressure ripples exit the expansion chamber.

In an embodiment the pressure ripple reduction chamber is designed as a substantially elongate member comprising a first closed terminal end and a second closed terminal end, wherein the inlet and the outlet are both provided near the same terminal end. In this manner the terminal end on which the inlet and outlet are not provided can act as purely reflective member. Furthermore, by providing the inlet and outlet of the chamber on the same terminal end, it is possible to reduce the overall size of the expansion chamber and thus of the pressure ripple reduction device.

In an embodiment the inlet comprises a tubular member which extends into the expansion chamber. In particular this embodiment has the inlet and the outlet on the same terminal end of the of the expansion chamber, such that the inlet and outlet are spaced apart as far as possible so as to maximize the interaction of the (reflected) pressure ripples and to further reduce the chance that the pressure ripples exit the expansion chamber.

In an embodiment the pressure ripple reduction chamber is integrally attached to a pump body of the pump. This provides a very compact hydraulic system. Furthermore, this will locate the pressure ripple reduction chamber close to the pump and improves the overall performance of the hydraulic system as the pressure ripples are reduced as close to their source as possible. Another advantage of this embodiment is that one pressure ripple reduction device can be used in combination with several hydraulic actuators even when said hydraulic actuators experience different loads and thus have a different effect on the hydraulic pump. This is possibly as the pressure ripple reduction device can effectively handle a range of frequencies, i.e. it is a broadband damper.

In an embodiment the outlet comprises an insert element comprising a through bore defining the cross-sectional area of the outlet. This provides an easy and well controllable way of providing the outlet with a desired cross-sectional area.

The present invention also relates to a method of reducing hydraulic pressure ripples in a hydraulic system, the method comprising, providing a hydraulic actuation device for moving one or more moveable components, the device comprising a hydraulic pump with an associated drive means, the pump being designed to supply pressurized hydraulic fluid to one or more hydraulic actuators through hydraulic hoses, and a reservoir for hydraulic fluid;

actuating the hydraulic actuators acting on said moveable components so as to move said one or more moveable components;

providing a pressure ripple reduction device in a hydraulic hose between the pump and the one or more actuators for reducing pressure ripples in the hydraulic fluid originating from the hydraulic pump, the pressure ripple reduction device comprising an expansion chamber comprising an inlet and an outlet, the inlet and outlet defining a flow path through the ripple reduction chamber for the hydraulic fluid, and flowing the hydraulic fluid through the pressure ripple reduction chamber from the inlet to the outlet, wherein the expansion chamber has a cross-sectional area and the outlet has a cross-sectional area, wherein a ratio between said cross-sectional areas is between 5 and 40000, preferably between 50 and 20000 and more preferably between 500 and 5000. Such a method provides the same advantages as indicated heretofore.

Further advantageous embodiments of the hydraulic system according to the invention are described in the claims and in the following description with reference to the drawing, in which:

DETAILED DESCRIPTION OF THE PREFERRED EMBODIMENT

The hydraulic system according to the invention is particularly suitable to be used in vehicles having moveable components. In particular in luxury vehicles such as large SUV's having large tailgates or convertibles having convertible or foldable roofs non-manual operation of such components contribute to the overall feel of luxury and practicality of the car.

As an example of the use of a hydraulic system according to the invention is described below in combination with a convertible roof for a car, in which the car comprises a convertible top assembly having a hydraulic actuating device for opening and closing the convertible top assembly.

Figure 1:
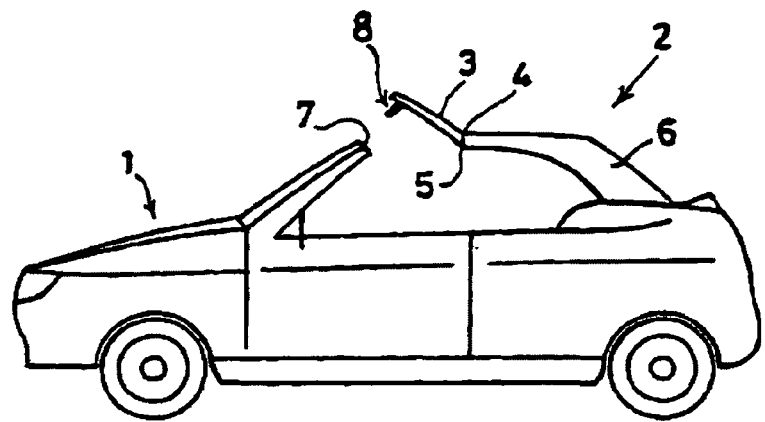
FIG. 1 diagrammatically depicts a side view of a vehicle with a convertible top assembly,
FIG. 2 diagrammatically depicts a perspective view of the convertible top assembly from FIG. 1.

FIG. 1 shows a car 1 of the convertible type, having a folding roof 2 of a mechanical design which is known per se and which can be used to open or close the passenger compartment. The folding roof 2 has a front folding-roof part 3 which is attached to the remaining part 6 of the folding roof 2 via a pivoting attachment 4 about pivot pin 5.

In FIG. 1, the folding roof 2 is shown in a pre-closure position, in which the front folding-roof part 3 is in an upwardly pivoted position with respect to the closed position of the folding roof 2.

To lock the folding roof 2 in the closed position, a hydraulically actuated latching member 8 is provided on the front folding-roof part 3, which latching member, when actuated, can be brought into engagement with an associated catch feature in the windscreen header 7.

Figure 2:
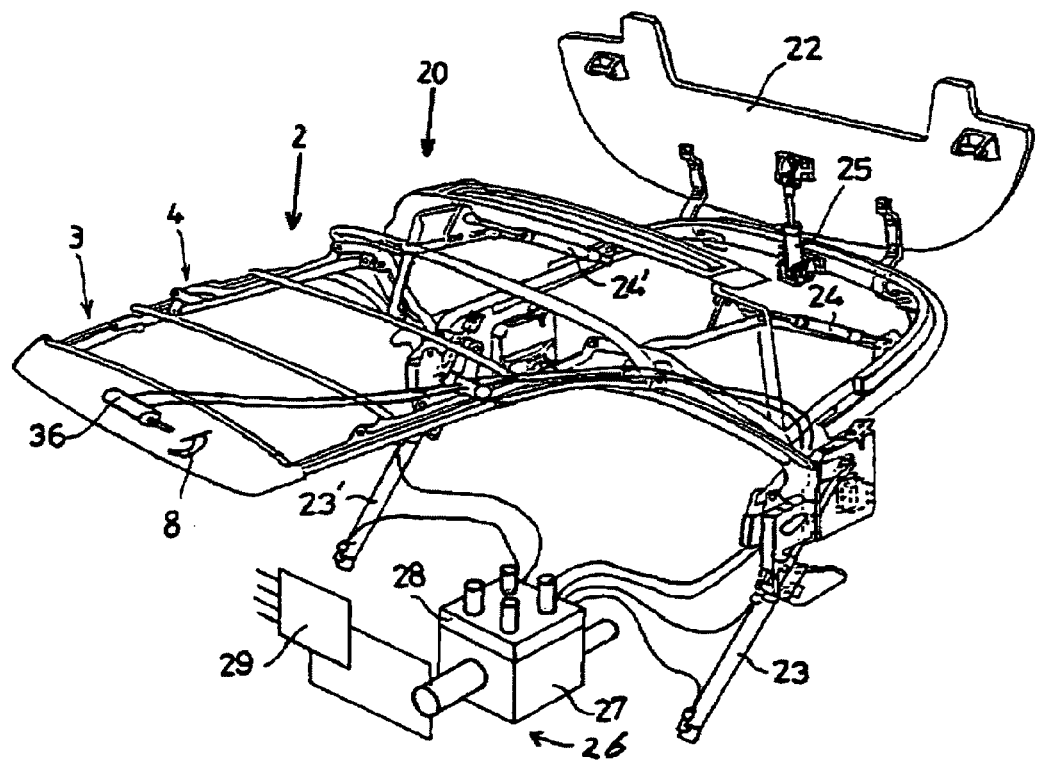

FIG. 2 shows the convertible top assembly 20 having the folding roof 2 and a cover 22 for covering the storage compartment for the folding roof 2 in the open position. The movements of the folding roof 2 and the cover 22 are brought about automatically by means of a hydraulic actuating device. This actuating device comprises two pairs of hydraulic actuators or cylinders 23, 23', 24, 24' for moving the folding roof 2, a hydraulic cylinder 25 for moving the cover 22 and a hydraulic cylinder 36 for operating the latch 8. The cylinders 23-25, 36 are connected, via associated hydraulic hoses, to a hydraulic pump unit 26, which comprises an electrically drivable pump 27, a valve block 28 and an associated electronic control unit 29 for automatically opening and closing the folding roof 2.

Pressurized hydraulic fluid is supplied to the respective cylinders 23-25, 36 via the valve block 28, so that these cylinders are able to move the associated components of the convertible top assembly.

The speed at which each of the cylinders executes its movement depends on the amount of hydraulic fluid which is fed to the cylinder per unit time. The actuating device comprises control means which are designed to control the volumetric output of the pump 27 during actuation of the convertible top assembly.

Preferably, these control means are designed in such a manner that over as much as possible of the actuation of the convertible top assembly the arithmetic product of the hydraulic pressure and the volumetric output by the pump is substantially constant. This control is based on the fact that the electric motor which drives the pump 27 has a specific maximum power which it can output, which power, if appropriate, may be higher than the standard power which can be outputted in view of the short time for which the electric motor is operating. In practice, it will be attempted to move the folding roof from the open position to the closed position within around 20 seconds. The control is based on the fact that at any moment of the actuation the hydraulic pressure required at that moment is delivered in order to carry out the movement, and that the volumetric output is then adjusted to the maximum possible value, obviously within the range which is permissible for the motor. As a result, the movements can be carried out as quickly as possible, the movements which require a high pressure taking place with a low pump volumetric output and the movements which require a low pressure taking place with a higher pump volumetric output.

Obviously, for each pump there can be a maximum and minimum pump volumetric output, and the volumetric output is controlled within the intervening range.

It is possible for the pump to be driven by an electric motor with a controllable rotational speed, in which case the control means are designed to control the rotational speed of the electric motor.

In a particular embodiment, the pump could be driven by an electric motor of the type which has a constant power output. The volumetric output of the pump (which is dependent on the number of revolutions of the drive shaft) is partly determined by the resistance which the pump encounters while the hydraulic fluid is being pressurized and thus increases or reduces the torque required from the drive motor.

In another variant, which in practice is simple to carry out, the pump itself is of controllable design, so that the pump volumetric output per revolution of the drive shaft can be adjusted. In this case, consideration may be given, for example, to a plunger pump, in which case the pump stroke of the plunger(s) is controllable. This is achieved, for example, through the use of an axial plunger pump or a radial plunger pump. Such pumps are known per se and are not discussed in further detail. An example of a radial plunger pump and its functioning can for example be learned from European patent application EP 1.052.127 A1.

By controlling the output of the pump, it is also possible to define the speed of a specific movement and a specific movement can be carried out with a definite speed profile, for example in such a manner that the folding roof 2 moves slowly in the vicinity of the end positions and more quickly between these positions.

Figure 3:
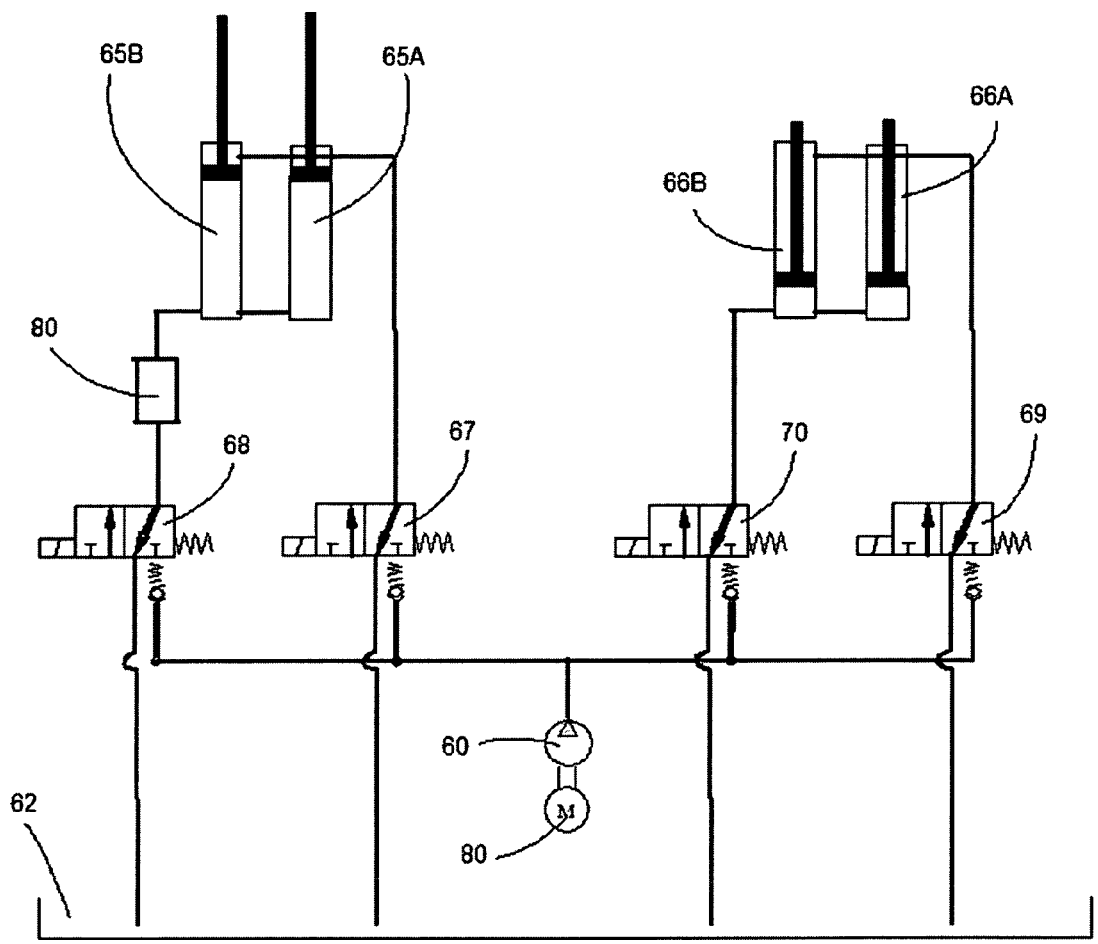
FIG. 3 shows a hydraulic circuit diagram of a hydraulic actuating device for a convertible top assembly with pressure ripple reduction device.

FIG. 3 shows the hydraulic circuit diagram of a simple design of the hydraulic actuating device of a convertible top assembly. The circuit diagram shows a pump 60 which is driven by a motor 80. The pump 60 may be of a kind having a controllable output in a way known per se, such as for example described in EP 1.052.127 A1. The pump 60 sucks in liquid from reservoir 62. The pump 60 has a output port 63.

The actuating device furthermore comprises two hydraulic actuators 65A, 65B which are used, for example, to move the main bow of the convertible top assembly. Furthermore, there are two actuators 66A, 66B which are used, for example, to move a tonneau cover.

Each of the connections of the actuators 65A, 65B can be connected, via an associated electrically actuable valve 67 or 68, to the output port 63 of the pump 60 or to the reservoir 62. Each of the connections of the actuators 66A, 66B can also be connected via an associated valve 69, 70 to the output port 63 or to the reservoir 62.

In a design which is not shown, there is provision for the pump itself to be unable to control the volumetric output and for the control to be effected by means of the rotational speed of the electric drive motor. This could, for example, take place using pulse width modulation of the power supply to the motor. In practice, however, this is less advantageous than the solution described above, since the low-voltage motors which are currently used are supplied with high current intensities (up to 30 amps), and controlling these motors requires expensive components. Furthermore, the control range is relatively limited, for example between 60 and 100% of the maximum rotational speed, while the solution described above permits a much greater control range. However, in the event of any increase in the voltage of the vehicle battery, it is conceivable that controlling the pump volumetric output in this way may also become attractive.

In another variant, a specific type of electric motor is used to drive a further pump which cannot be controlled. In this case, the motor, within a defined range, has a characteristic which is such that a constant power output is obtained. The pump volumetric output is then controlled by the characteristic of the electric motor.

As described above, the pump 60 is for example a so-called plunger pump. A typical example of such a plunger pump comprises 5 or 6 plungers which rotate at a speed of about 5000 rpm. During operation each time a plunger or piston contributes to pressurizing the hydraulic fluid, it does so by delivering a small pressure pulsation. This means that the complete pump 60 delivers pressurized hydraulic fluid to the hydraulic system at a pulsation frequency of about 400-500 Hz, depending on the amount of plungers. These pulsations or pressure ripples are transferred to the hydraulic system by the flowing hydraulic fluid and will result in audible noise in the system. In particular when used in cars, the hydraulic actuators or cylinders and also other parts of the hydraulic system are mounted on sections of the car that exhibit a relatively low stiffness. Such sections are for example the body work of the car. This is particularly true for hydraulic actuators that are used for opening and closing tailgates, where the actuators are mounted to the roof section. Such noise, or more specific fluid born noise, is considered highly unpleasant in particular when such a system is included is relatively expensive cars. Test have proven that noise levels that may be contributed to this hydraulic noise are as high as 58 dB(A).

When opening and/or closing the convertible roof top or the (heavier) tailgate of a car, the load experienced by the hydraulic pump will vary and consequently the pump speed will vary in response to the load of the pump. For a plunger-type hydraulic pump this means that its rotational speed will vary and the frequency of the pressure pulsations (pressure ripples) will also vary. Hence, a range of frequencies of hydraulic noise may occur in the hydraulic system during operation.

In order to dampen or reduce the hydraulic noise, or the source thereof being the pressure ripples in the hydraulic fluid, the hydraulic system described above is provided with a pressure ripple reduction device 80 (see FIG. 3). The pressure ripple reduction device 80 is in the example shown in FIG. 3 located between the pump 60 and the hydraulic actuators 65A and 65B, in particular the device 80 is located in the high pressure hose between the pump 60 and said actuators 65A, 65B. Although not shown, it is of course also possible to provide a similar pressure ripple reduction device in the hydraulic hose between the pump 60 and the hydraulic actuators 66A, 66B. In the example of FIG. 3, the device 80 is specifically targeted at reducing pressure ripples and thus hydraulic noise generated in the actuators 65A and 65B. It is also possible to locate the device 80 as close as possible to the hydraulic pump 60, i.e. between the pump 60 and the valves 67, 68, 69 and 70. This will be explained in more detail with the description of FIG. 5.

Figure 4:
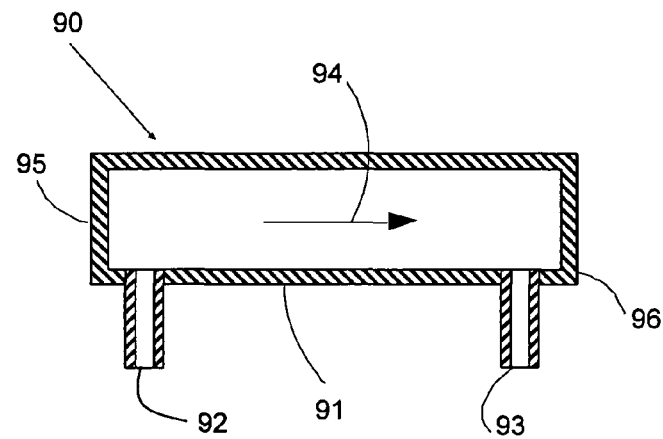
FIG. 4 shows a first embodiment of an expansion chamber.

FIG. 4 schematically shows an example of the pressure ripple reduction device 80. The pressure ripple reduction device 80 comprises an elongate tubular member 91, which is an expansion chamber into which hydraulic fluid can enter through inlet 92 provided near a first terminal end 95 of the tubular member 91. The hydraulic fluid can exit the tubular member or expansion chamber 91 through an outlet 93 which is provided near a second terminal end 96 thereof. The chamber 91 is preferably cylindrical in design, but other designs are also possible. The direction of flow through the chamber 91 is indicated by arrow 94. As can be seen in FIG. 3 and FIG. 4 the expansion chamber 91 is part of the flow path which the hydraulic fluid must follow between the inlet 92 and outlet 93. This means that the full flow rate of hydraulic fluid will pass through the expansion chamber 91. In other words, the expansion chamber is designed to form an integral part of the flow path of the hydraulic fluid in the hydraulic system contrary to known pressure ripple reduction devices that are of the earlier mentioned Helmholz-type and rely on a 180 degrees phase shift for dampening pressure ripples.

Inside the expansion chamber 91 the pressure waves or pressure ripples present in the hydraulic fluid will be reflected of the inner wall of the chamber 91. These reflected pressure ripples will interfere with each other and consequently the pressure ripples will be reduced. This means that the pressure ripples in the flowing hydraulic fluid have been reduced when the hydraulic fluid leaves the chamber 91 through the outlet 92. Reduction or dampening of the pressure ripples will lead to an attenuation of the hydraulic noise in the hydraulic system. By the provision of an expansion chamber that has inner walls that are able to reflect the pressure ripples, the pressure ripples are reduced by energy loss. This means that pressure ripples are not cancelled merely by a one hundred and eighty (180) degrees phase shift. This allows the attenuation of multiple or a broad band of frequencies, i.e. the expansion chamber acts as a broadband dampening device.

Figure 5:
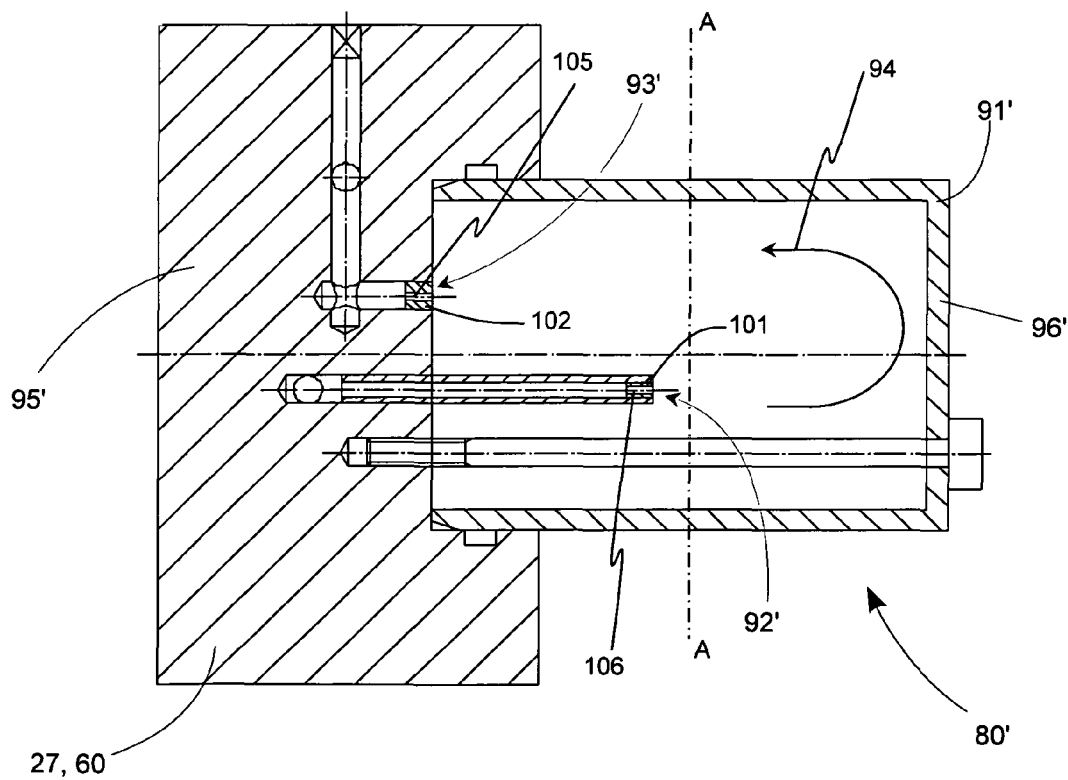
FIG. 5 shows a second embodiment of an expansion chamber.

An alternative embodiment of the invention is shown in FIG. 5, which is the same as the above described embodiment apart from the differences described below.

The pressure ripple reduction device 80' comprises an expansion chamber 91' that has both the inlet 92' and the outlet 93' provided at the same terminal end 95' of the chamber 91'. The second terminal end 96' is provided such that it faces the inlet 92' and the outlet 93'. In this manner the expansion chamber 91' can be made very compact and it is expected that the second terminal end 96' will together with the rest of the inner wall of the expansion chamber 91' further enhance the reflective properties of the expansion chamber 91' and enhance the dampening or reduction of the pressure ripples (hydraulic noise) in the hydraulic system.

Furthermore, as can be seen in FIG. 5, the outlet 93' is provided with an insert element 102 that comprises a through bore 105. The through bore 105 may have a circular cross section, but different cross-sections are also conceivable. The through bore 105 defines a cross-sectional area of the outlet 93'. The expansion chamber 91' also has a cross-sectional area, indicated by A-A in FIG. 5. This cross-sectional area A-A is substantially perpendicular to the direction of flow from the inlet 92' respectively to the outlet 93' as indicated with arrows 94. The same is applicable to the embodiment of FIG. 4, with the difference that the cross-sectional area is substantially perpendicular to the main direction of the fluid flow indicated with arrow 94.

The principle underlying the invention resides in the realization by the inventor that pressure ripples in the hydraulic fluid can be dampened when these pressure ripples are allowed to interact and by doing so to reduce their energy. In order to allow the pressure ripples in the hydraulic fluid to do so, the pressure ripples should preferably be contained completely inside the expansion chamber 91 or 91' and reflect of the inner wall(s) of the expansion chamber until the pressure ripples have cancelled each other out. In practice this can be achieved by reducing the chance or reduce the possibility for the pressure ripples to exit the expansion chamber by making the cross-sectional area of the outlet as small as possible. On top of that when the cross-sectional area of the expansion chamber is made as large as possible, the pressure ripples will have interacted with each other many times before coming across the outlet.

In the case of a hydraulic system used for opening and closing tail gates for example, practical values of the diameter of the through bore 105 and therefore of the outlet 93' are about between 0.4 to 2 mm. The lower limit is mainly determined by the fact that the through bore 105 should not act as a flow restriction. Hence, normally diameters of about 0.6 to 1.0 mm are used. An even more practical value is 0.8 mm. The upper limit of the diameter of the through bore 105 is in principle limited (determined) by the amount of dampening that is required. Practical values for the diameter of the expansion chamber are about between 5 and 80 mm. Normally, diameters between 20 and 60 mm would be used, in particular a diameter of 22 mm. These diameters mainly depend on the amount of space that is available for the expansion chamber to be mounted in. The larger the ratio between the cross-sectional areas of the expansion chamber and the outlet is, the better the dampening performance will be of the pressure ripple reduction device.

These values result in a ratio between the cross-sectional area of the expansion chamber and the cross-sectional area of the outlet of about 5 to 40000, preferably between 50 and 20000, more preferably between 500 and 5000.

In the embodiment of FIG. 5 the expansion chamber 91' is attached to the hydraulic pump 27, 60. In fact, the expansion chamber 91' is part of the housing of the pump 27, 60 and the expansion chamber 80' is located in a pressure line leading from the pump to the hydraulic actuators. To further increase the dampening properties of the expansion chamber 91' the inlet 92' comprises a tubular member that extends into the interior of the expansion chamber 91'. This allows the hydraulic fluid and consequently the pressure ripples present therein to enter the expansion chamber 80' about halfway, such that the interaction between the (reflected) pressure ripples is maximized.

The dampening performance of the pressure ripple reduction device can be further improved by also providing the inlet 92' with an insert element 101 in a similar manner as the insert element 102 of the outlet 93'. In the example of FIG. 5, the inlet 92' is also tubular in design. The insert element 101 comprises a through bore 106 which provides a narrowing of the diameter of the inlet 92' in a similar manner as with respect to the outlet 93'. The effect thereof is that again the ratio between the cross-sectional area of the expansion chamber 91' and that of the inlet 92' is as large as possible. More in detail this has the effect that the pressure ripples will be prevented to re-enter the inlet 92' and escape from the expansion chamber 91'. This further improves the dampening performance, in fact the larger the ratio between the cross-sectional area of the expansion chamber and the cross-sectional area of the through bores, the better the damping of the pressure waves will be.

The location of the pressure ripple reduction device 80' in the embodiment of FIG. 5 is such, that it is located upstream of the valves 67, 68, 69 and 70 (see FIG. 3) and in the hydraulic line or pressure line that all hydraulic actuators have in common. This means that one damper or pressure ripple reduction device can be used in combination with several hydraulic actuators (65A, 65B, 66A and 66B see FIG. 3). In practice said hydraulic actuators will experience different loads and thus have a different effect on the hydraulic pump. This means that each hydraulic actuator will have its specific effect on the rotational speed of the pump and thus on the hydraulic noise it generates. When the pressure ripple reduction device according to the invention is located just after the hydraulic pump, but before the valves and actuators, the pressure ripple reduction device can effectively dampen hydraulic noise in a frequency range. However, its is also possible to use multiple pressure ripple reduction devices, for example one for each hydraulic actuator, or use a number of pressure ripple reduction devices in series. The latter setup (in series) in particularly has proven to provide improved dampening performance for high frequency pressure ripples.

It is further noted that also the length of the pressure ripple reduction device, i.e. the length of the expansion chamber has some effect on the dampening performance. More in particular an increase in the length of the expansion chamber will improve the dampening of pressure ripples.

It is noted, that it is also possible to locate the pressure ripple reduction of FIG. 4 as close as possible behind the pump and preferably between the hydraulic pump and the valves.

Figure 6A:
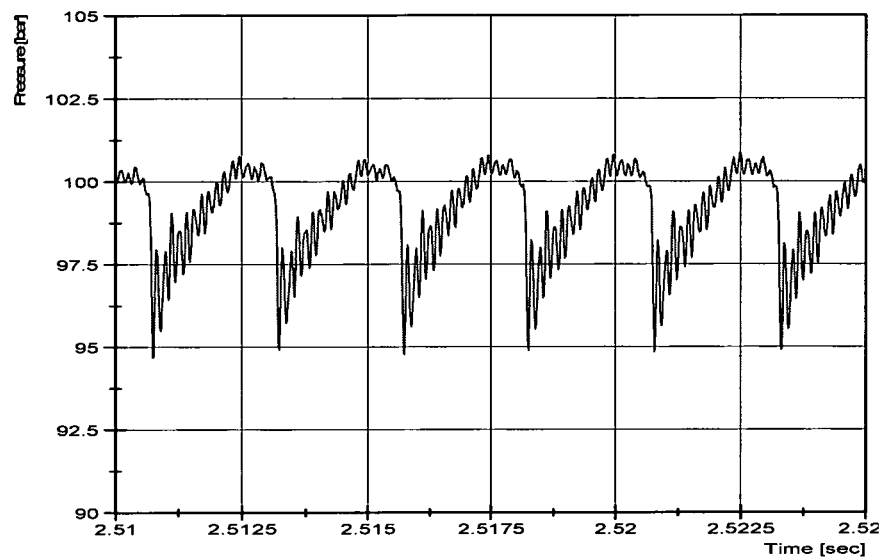
FIGS. 6A, 6B show test results of a system without respectively with a pressure ripple reduction device.
Figure 6B:
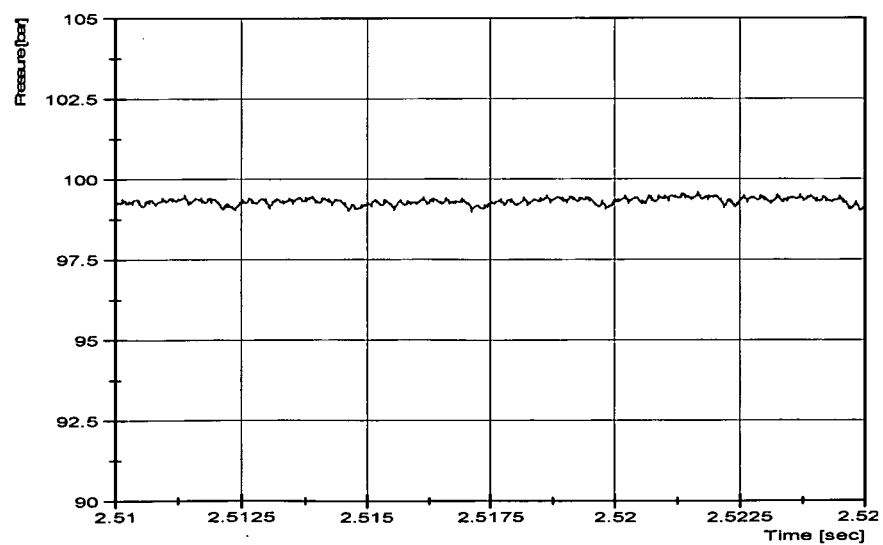

As an example of the effect of the pressure ripple reduction device on the reduction of hydraulic noise due to pressure ripples present in the hydraulic fluid, some test results are shown in FIGS. 6A and 6B. Both figures shown a graph with on the horizontal axis the time in seconds and on the vertical axis the pressure in the hydraulic system in bar. The pump used was a plunger pump having a rotational speed of 4000 rpm and having 6 plungers. This results in a pulsation frequency of 400 Hz. The plunger pump had a plunger diameter of 3.5 mm and an excenter of 0.75 mm.

FIG. 6A shows the results of the measurements in the hydraulic system without using the pressure ripple reduction device according to the invention. As can be seen, the pressure varies with about 5 bars maximum between 100 and 95 bars approximately.

FIG. 6B shows the test results of the same hydraulic system, however now with the pressure ripple reduction device according to the invention installed. The effect can be clearly seen as the variation in pressure has almost fully disappeared. In these measurements, the pressure pulsations as illustrated in FIG. 6A amounted to about 57 dB(A) in sound level. After installment of the pressure ripple reduction device, the sound levels reduced to about 48 dB(A).

It is noted that the hydraulic system according to the invention, and in particular the pressure ripple reduction device to be used in such a hydraulic system, is not limited to the examples shown. In particular the hydraulic system according to the invention can also be used to actuate so-called tailgates of cars, or other moveable parts of a vehicle such as a loading door of a large truck or truck cabins. Other areas of application where the inventive system can also be used are for example to be found in the field of hospital beds and scan tables, where comfortable and noise-free operation is wanted.

It is further noted that it is conceivable to provide the outlet, inlet and expansion chamber or any combination thereof with a variable cross-sectional area to allow the pressure ripple reduction device to be tuned according to personal settings or requirements.

The invention claimed is:

1. In a hydraulic system for a vehicle, comprising: a hydraulic actuation device for moving one or more moveable components of the vehicle, the actuation device comprising a hydraulic pump with an associated drive means, a reservoir for hydraulic fluid as well as one or more hydraulic actuators connected to the pump through hydraulic hoses, the hydraulic actuators acting on the one or more moveable components and the pump being designed to supply pressurized hydraulic fluid to the one or more hydraulic actuators, and a pressure ripple reduction device for reducing pressure ripples in the hydraulic fluid originating from the hydraulic pump, the improvement wherein: said pressure ripple reduction device is provided in a pressure line between the pump and the one or more actuators, and comprises an expansion chamber having an inlet and an outlet, wherein the inlet and outlet are distanced from each other so as to define a flow path through the expansion chamber for the hydraulic fluid, and wherein the expansion chamber has a cross-sectional area and the outlet has a cross-sectional area, wherein a ratio between said cross-sectional areas is between 5 and 40000, and wherein the expansion chamber is integrally attached to a pump body of the pump.

2. A hydraulic system according to claim 1, wherein said ratio is between 50 and 20000.

3. A hydraulic system according to claim 2, wherein said ratio is between 500 and 5000.

4. A hydraulic system according to claim 1, wherein the inlet has a cross-sectional area that corresponds in size to the cross-sectional area of the outlet.

5. A hydraulic system according to claim 1, wherein the expansion chamber is designed as a substantially elongate member comprising a first closed terminal end and a second closed terminal end, wherein the inlet is provided near the first terminal end and the outlet is provided near the second terminal end.

6. A hydraulic system according to claim 1, wherein the expansion chamber is designed as a substantially elongate member comprising a first closed terminal end and a second closed terminal end, wherein the inlet and the outlet are both provided near the same terminal end.

7. A hydraulic system according to claim 6, wherein the inlet comprises a tubular member which extends into the expansion chamber.

8. A hydraulic system according to claim 1, wherein the outlet comprises an insert element comprising a through bore defining the cross-sectional area of the outlet.

9. A hydraulic system according to claim 1, wherein the inlet comprises an insert element comprising a through bore defining the cross-sectional area of the inlet.

10. A hydraulic system according to claim 1, wherein the hydraulic system comprises a plurality of pressure ripple reduction devices.

11. A hydraulic system according to claim 1, wherein said plurality of pressure ripple reduction devices are arranged in series.

12. A hydraulic system according to claim 1, wherein the hydraulic is part of a vehicle comprising a passenger compartment.

13. A hydraulic system according to claim 12, wherein the hydraulic system comprises one or more moveable components which components form part of a convertible top assembly or a tailgate assembly.

14. A method of reducing hydraulic pressure ripples in a hydraulic system, comprising: providing a hydraulic actuation device for moving one or more moveable components, the device comprising a hydraulic pump with an associated drive means, the pump being designed to supply pressurized hydraulic fluid to one or more hydraulic actuators through hydraulic hoses, and a reservoir for hydraulic fluid; actuating the hydraulic actuators acting on said moveable components so as to move said one or more moveable components; providing a pressure ripple reduction device in a hydraulic hose between the pump and the one or more actuators for reducing pressure ripples in the hydraulic fluid originating from the hydraulic pump, the pressure ripple reduction device comprising an expansion chamber comprising an inlet and an outlet, the inlet and outlet being distanced from each other to define a flow path through the expansion chamber, and flowing the hydraulic fluid through the expansion chamber from the inlet to the outlet, wherein the expansion chamber has a cross-sectional area and the outlet has a cross-sectional area, wherein a ratio between said cross-sectional areas is between 500 and 5000.

15. In a hydraulic system for a vehicle, comprising: a hydraulic actuation device for moving one or more moveable components of the vehicle, the actuation device comprising a hydraulic pump with an associated drive means, a reservoir for hydraulic fluid as well as one or more hydraulic actuators connected to the pump through hydraulic hoses, the hydraulic actuators acting on the one or more moveable components and the pump being designed to supply pressurized hydraulic fluid to the one or more hydraulic actuators, and a pressure ripple reduction device for reducing pressure ripples in the hydraulic fluid originating from the hydraulic pump, the improvement wherein:

said pressure ripple reduction device is provided in a pressure line between the pump and the one or more actuators, and comprises an expansion chamber having an inlet and an outlet, wherein the inlet and outlet are distanced from each other so as to define a flow path through the expansion chamber for the hydraulic fluid, and wherein the expansion chamber has a cross-sectional area and the outlet has a cross-sectional area, wherein a ratio between said cross-sectional areas is between 500 and 5000.

16. A hydraulic system according to claim 15, wherein the inlet has a cross-sectional area that corresponds in size to the cross-sectional area of the outlet.

17. A hydraulic system according to claim 15, wherein the expansion chamber is designed as a substantially elongate member comprising a first closed terminal end and a second closed terminal end, wherein the inlet is provided near the first terminal end and the outlet is provided near the second terminal end.

18. A hydraulic system according to claim 15, wherein the expansion chamber is designed as a substantially elongate member comprising a first closed terminal end and a second closed terminal end, wherein the inlet and the outlet are both provided near the same terminal end.

19. A hydraulic system according to claim 18, wherein the inlet comprises a tubular member which extends into the expansion chamber.

20. A hydraulic system according to claim 15, wherein the outlet comprises an insert element comprising a through bore defining the cross-sectional area of the outlet.

21. A hydraulic system according to claim 15, wherein the inlet comprises an insert element comprising a through bore defining the cross-sectional area of the inlet.

22. A hydraulic system according to claim 15, wherein the hydraulic system comprises a plurality of pressure ripple reduction devices.

23. A hydraulic system according to claim 15, wherein said plurality of pressure ripple reduction devices are arranged in series.

24. A hydraulic system according to claim 15, wherein the hydraulic is part of a vehicle comprising a passenger compartment.

25. A hydraulic system according to claim 24, wherein the hydraulic system comprises one or more moveable components which components form part of a convertible top assembly or a tailgate assembly.

26. In a hydraulic system for a vehicle, comprising: a hydraulic actuation device for moving one or more moveable components of the vehicle, the actuation device comprising a hydraulic pump with an associated drive means, a reservoir for hydraulic fluid as well as one or more hydraulic actuators connected to the pump through hydraulic hoses, the hydraulic actuators acting on the one or more moveable components and the pump being designed to supply pressurized hydraulic fluid to the one or more hydraulic actuators, and a pressure ripple reduction device for reducing pressure ripples in the hydraulic fluid originating from the hydraulic pump, the improvement wherein:

said pressure ripple reduction device is provided in a pressure line between the pump and the one or more actuators, and comprises an expansion chamber having an inlet and an outlet, wherein the inlet and outlet are distanced from each other so as to define a flow path through the expansion chamber for the hydraulic fluid, and wherein the expansion chamber has a cross-sectional area and the outlet has a cross-sectional area, wherein a ratio between said cross-sectional areas is between 5 and 40000, wherein the hydraulic is part of a vehicle comprising a passenger compartment, and wherein the hydraulic system comprises one or more moveable components which components form part of a convertible top assembly or a tailgate assembly.

27. A hydraulic system according to claim 26, wherein said ratio is between 50 and 20000.

28. A hydraulic system according to claim 26, wherein the inlet has a cross-sectional area that corresponds in size to the cross-sectional area of the outlet.

29. A hydraulic system according to claim 26, wherein the expansion chamber is designed as a substantially elongate member comprising a first closed terminal end and a second closed terminal end, wherein the inlet is provided near the first terminal end and the outlet is provided near the second terminal end.

30. A hydraulic system according to claim 26, wherein the expansion chamber is designed as a substantially elongate member comprising a first closed terminal end and a second closed terminal end, wherein the inlet and the outlet are both provided near the same terminal end.

31. A hydraulic system according to claim 30, wherein the inlet comprises a tubular member which extends into the expansion chamber.

32. A hydraulic system according to claim 26, wherein the outlet comprises an insert element comprising a through bore defining the cross-sectional area of the outlet.

33. A hydraulic system according to claim 26, wherein the inlet comprises an insert element comprising a through bore defining the cross-sectional area of the inlet.

34. A hydraulic system according to claim 26, wherein the hydraulic system comprises a plurality of pressure ripple reduction devices.

35. A hydraulic system according to claim 26, wherein said plurality of pressure ripple reduction devices are arranged in series.

* * * * *

UNITED STATES PATENT AND TRADEMARK OFFICE
CERTIFICATE OF CORRECTION

PATENT NO. : 8,500,187 B2  
APPLICATION NO. : 12/989237  
DATED : August 6, 2013  
INVENTOR(S) : Daniël van't Veen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this

Fifteenth Day of September, 2015

Michelle K. Lee
*Director of the United States Patent and Trademark Office*